Inventor
JOSEPH CARY
By
William R. Lieberman
Attorney

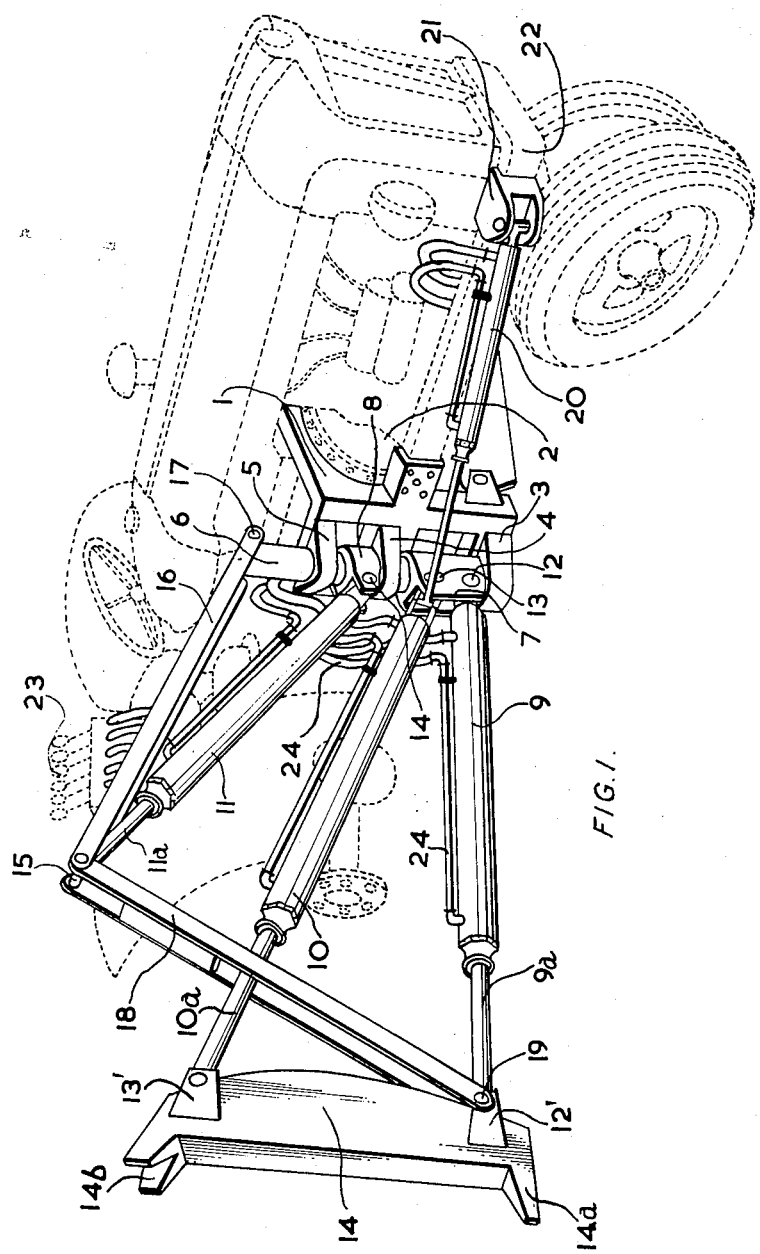

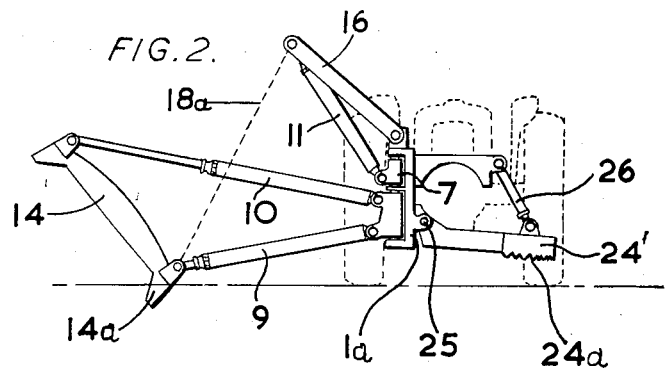
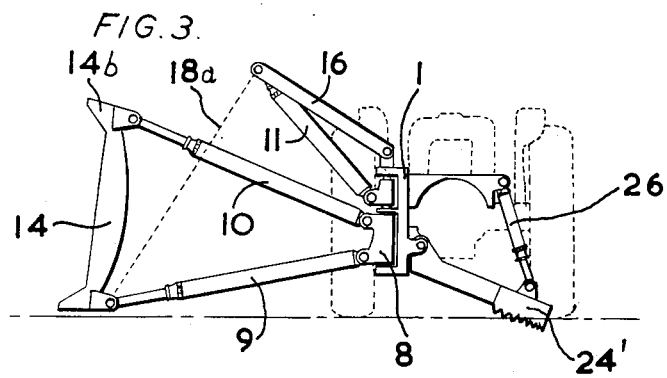
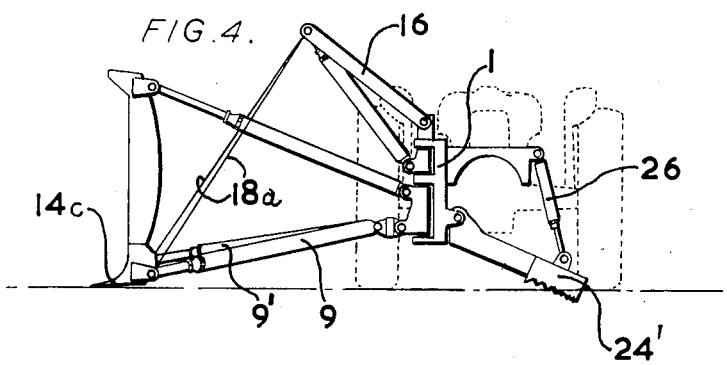

May 9, 1961   J. CARY   2,983,482
BUSH-CLEARING APPARATUS
Filed Dec. 17, 1957   6 Sheets-Sheet 4

Inventor
JOSEPH CARY
By William R. Lieberman
Attorney

Inventor
JOSEPH CARY
By
William R. Liberman
Attorney

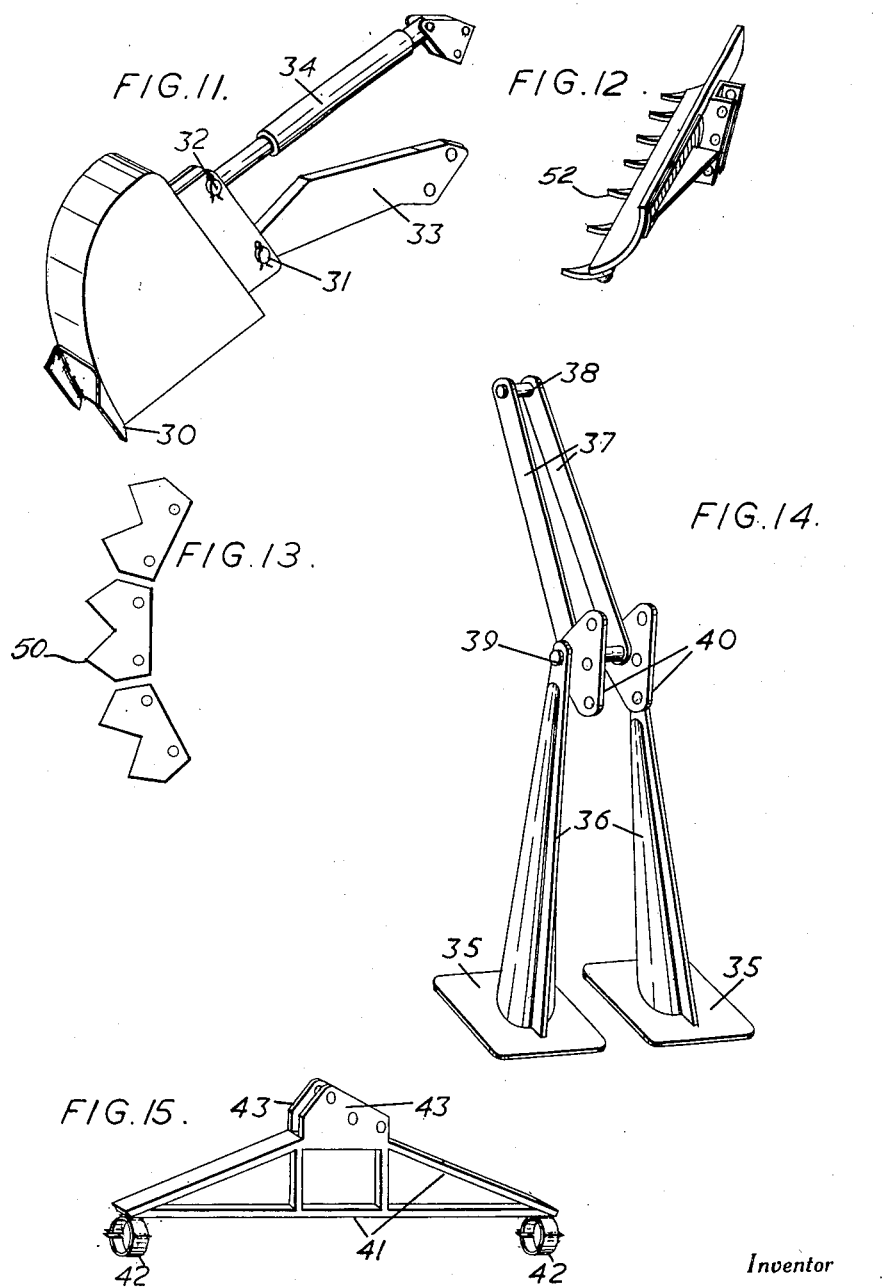

United States Patent Office 2,983,482
Patented May 9, 1961

2,983,482

BUSH-CLEARING APPARATUS

Joseph Cary, 11 Peterborough Ave., Eastlea, Salisbury, Southern Rhodesia

Filed Dec. 17, 1957, Ser. No. 703,459

Claims priority, application Union of South Africa Dec. 24, 1956

6 Claims. (Cl. 254—132)

The present invention relates generally to improved ground clearing equipment and it relates particularly to an improved bush and tree clearing machine.

It is a principal object of the present invention to provide an improved ground clearing machine.

Another object of the present invention is to provide an improved tractor borne and driven brush and tree clearing machine applicable to a wide variety of uses and conditions.

Still another object of the present invention is to provide an improved tree uprooting and clearing machine of a tractor bearing type which is highly versatile and flexible, rugged and simple to operate.

The above and other objects of the present invention will become apparent from a reading of the following description taken in conjunction with the accompanying drawings, wherein—

Figure 1 is a perspective view of an apparatus according to this invention, as suitable for the felling of substantial trees, and constructed as an attachment for a tractor of known type;

Figures 2 and 3 are end elevations corresponding to Figure 1, showing the elements of the device in various positions;

Figure 4 is a similar view to Figures 2 and 3 but of the device embodying twin rams operating on the base of the head element;

Figure 5:
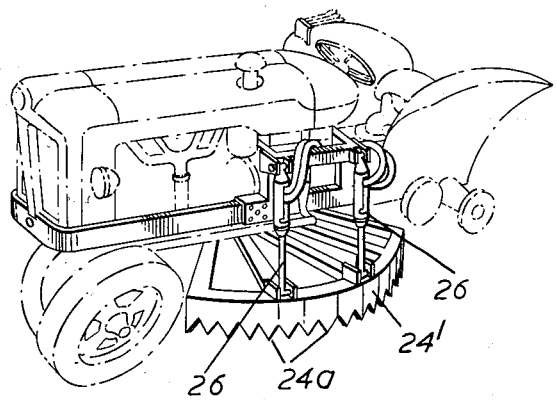
Figure 5 is a further perspective view, corresponding to Figure 1 but showing the ground-engaging device as viewed from the opposite side of the tractor.

Figures 7, 8, 9 and 10 are diagrammatic views whereof the first three show stages of felling an individual tree and the sequence of ram actions from adjacent ground level up, involved in the particular usage of the apparatus and the fourth figure shows how the felled tree can be maneuvered for windrowing; and Figures 11, 12, 13, 14, 15 and 16 are illustrations of various ancillary tools or devices usable with the main apparatus for special purposes.

The present invention in a sense contemplates the provision of an improved apparatus of the character described, comprising a tractor mounted support member, a head member spaced outwardly of said support member and first, second and third independently actuated fluid operated ram members having their inner ends pivoted to said support member and diverging outwardly relative to each other and pivoted to triangularly disposed points on said head member.

The convenient embodiment of the invention shown in Figures 1 to 3 and 5 comprises the stoutly constructed frame 1 configurated suitably for fixing securely to the tractor body 2, in any convenient manner, as at one side. The frame comprises eyes 3, 4 and 5 arranged coaxially one above the other as shown, and containing a shaft or trunnion 6 on which bosses or collars 7 and 8 are provided between the eyes 3 and 4 so that they can be turned about the trunnion axis.

Three hydraulic rams 9, 10 and 11 are pivotally connected at their closed cylinder ends by separate horizontally arranged pivot pins 12, 13 and 14 respectively to the bosses or collars 7 and 8, as shown, and the lower two ram plungers 9a and 10a are pivotally connected at their extremities to webs 12' and 13' provided at the lower and upper ends of a stoutly constructed elongated head member 14.

The third ram 11 radiating from the pivot at 14 is pivotally connected at the end of its plunger, by a pivot pin 15 to one end of a twin link or lever 16 the opposite end of which is pivotally connected by a horizontal pin 17 to the top of the trunnion 6, which latter can rotate in harmony with the bosses or collars on its lower parts.

The member 16 forms one link of a toggle pair whereof the other, 18, reaching to a pivotal connection coincident with the connection of the lowest ram plunger 9a with the head 14, may be a rigid link as shown in Figure 1, or a chain or other such flexible tension element or elements as indicated at 18a in Figures 2 to 4.

An additional ram 20, arranged to lie in a horizontal plane and to react between a pivotal connection at 21, provided on a forward region of the tractor chassis 22, and the inner or cylinder end of the ram 10, serves for orientating the rams 9, 10 and 11 in the desired direction from the side of the tractor (i.e. with respect to the frame 1) and also for imparting, if desired, a swaying or other such movement to the combination of these other rams.

Under the control of suitably concentrated and located control handles or the like as 23 (readily accessible preferably from the operator's seat on the tractor) pipe lines as 24 supply the operating hydraulic pressure fluid for ram actuations.

Referring more especially to Figures 2, 3, 4 and 5, the ground-engaging member by which the frame 1, with its attached rams, is securely anchorable to the ground, comprises a strongly constructed and reinforced arcuate member 24' having a serrated bottom edge 24a. This member is connected pivotally, at the centre of its curvature, by a horizontal pivot pin 25 to the lower part and inner side 1a of the frame, and by means of further powered rams or jacks 26, can be raised and lowered, as clear from Figures 2 to 4, into and out of anchoring engagement with the ground below the tractor. Initially the weight of the tractor determines the force with which the member 24' can be "rooted" to the ground to resist the forces arising on the frame during the various possible uses of the apparatus.

Adverting now to the head 14, to which a variety of movements, both bodily outwards and inwards in relation to the frame 1, and rocking or tilting and raising and lowering, can be imparted under heavy pressures if desired by suitable coordinations or sequences of ram operation, the head is conveniently of the shape shown. A pointed or spike formation 14a in front of the head's lower end is provided for forcing into the base of a tree trunk or into the upper part of its root; while a notched projection 14b in front of the upper end of the head can be applied to a higher point of the trunk and will ordinarily maintain such engagement under the heaviest ram forces usable in felling the tree.

Figure 7:
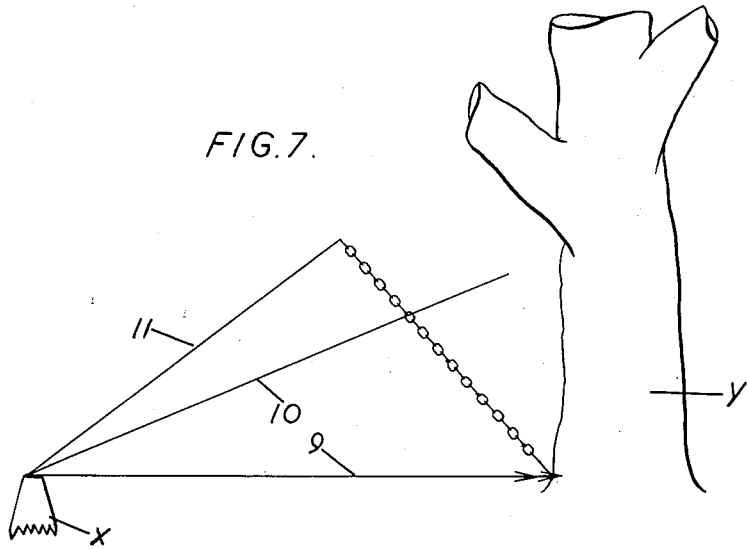
Figure 8:
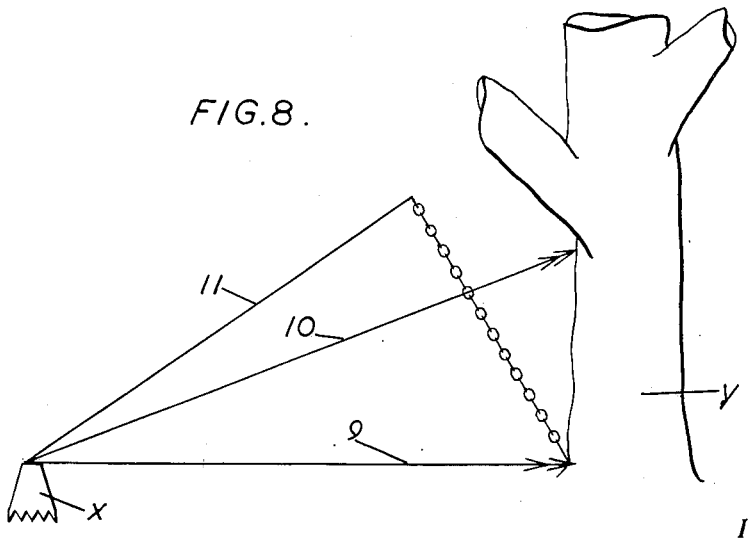
Figure 9:
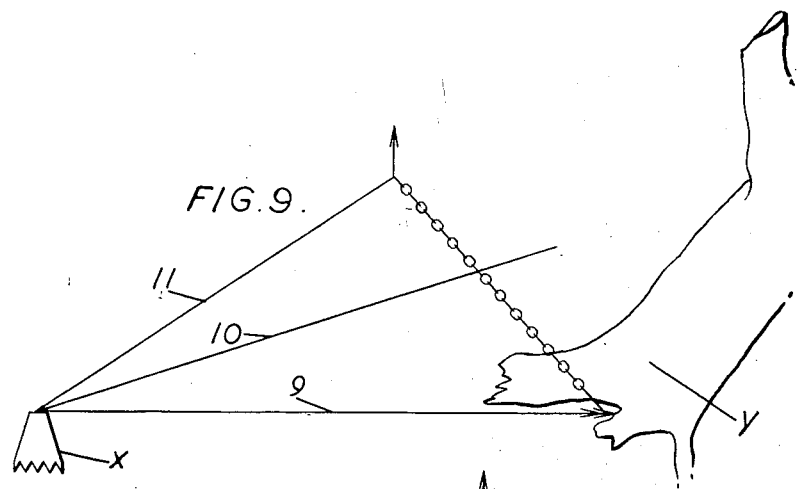

One typical method of tree felling with the apparatus as heretofore described is shown in Figures 7 to 9, diagrammatically.

From the heavily anchored frame at x opposite to the tree y the lowest ram 9 is extended to force the point 14a of the head 14 into the root region of the tree so as securely to engage same at or immediately above or below the ground level as indicated by the arrow head in Figure 7. No digging of the ground is required other than to secure firm engagement of the head against the base of the tree or the roots closely adjacent the surface of the ground. This action is followed up by operating the middle ram 10 so as to thrust the notched upper end 14b of the head hard against the trunk, as in Figure 8 and to continue this secondary thrust until the root hold is loosened as in Figure 8, whereupon by extension of the upper ram 11 the toggle arrangement is operated to raise the ram assembly as a whole as indicated by the upper arrow head in Figure 9 and, through continued engagement of the point 14a of the head with the trunk base or root, complete the uprooting operation.

Figure 10:
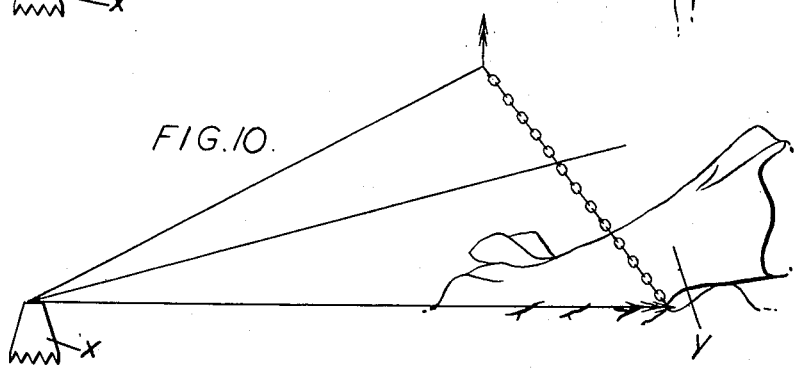
Figure 16:
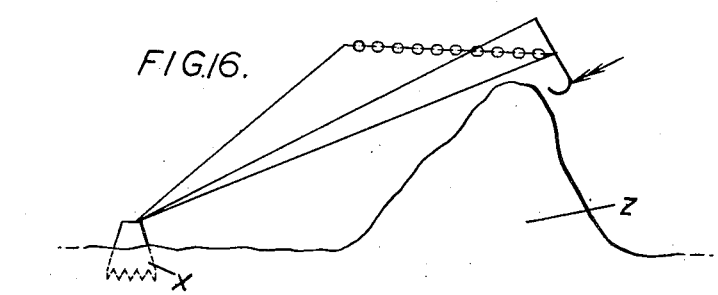

With the tree thus felled, it can be maneuvered forwardly or in any direction by lifting by means of the lower end of the head through the action of the toggle-operating ram 11, if necessary also by advancing the anchorage at x in stages and repeatedly retracting and extending the rams where the available ram reach may be insufficient to complete the windrowing (Fig. 10).

The above given example is not limitative, as different types and sizes of trees or herbage are most amenable to different methods of using the apparatus.

Figure 6:
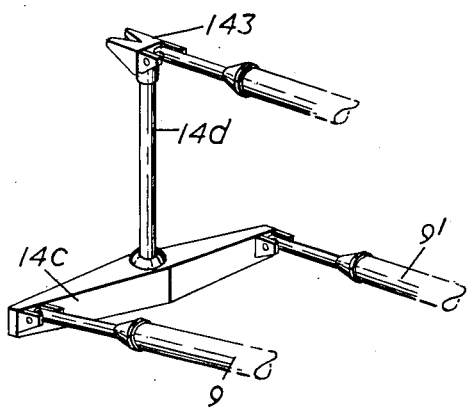
Figure 6 is a fragmentary perspective view of a modified arrangement of head with twin rams as in Figure 4.

Thus, for instance, it is advantageous in some cases to substitute for the head 14 of Figures 1, 2 and 3 a construction substantially as appearing in Figures 4 and 6. This modified form comprises an elongated preferably frontally toothed or serrated lower beam portion 14c to the extremities of which twin rams 9 and 9′ are connected in splayed arrangement from the base of the frame; while the notched formation 14b of the previously described head is carried on the central post 14d for applying thrust if necessary at the higher part of the tree and linked to 14c through knuckle joints at a suitable point or points.

Among other devices which may be included in or provided for use from time to time with the apparatus described, there may be for instance fittings as in Figure 13 which can be applied to the head or a substitute head to roughen or serrate it for the better frictional gripping of the trunk; these comprising toothed elements 50 (Figure 13) suitably linked together, and mounted on the forward end of the lower beam 14c, or if desired, integrally formed as a part thereof as noted above as are teeth 52 (Figure 12); bucket-type or other scrapers as in Figures 11 or 12 or shovels, such devices serving for various purposes including the reduction of antheaps and other obstructions; and a crane jib attachable to the head for certain operations including the lifting of a platform from which a large tree such as the Baobab may be operated upon at its upper part preparatory to the felling of its trunk.

The auxiliary device shown in Figure 11 includes the scraper 30 pivotally connected at 31 and 32 respectively to an arm 33 and one end of a further ram 34 which arm and ram are rigidly attachable to a head of suitable construction as 14, Figures 1, 2 and 3, which is itself controllable as a whole similarly to either of the previously described heads 14. With the aid of the additional ram 34, powered under separate control as are the others in the apparatus, a downward and inward scratching or clawing action can be applied to the scraper which provides a highly effective way of operating on the upper parts, or elsewhere, of antheaps. The action of such a device, which may be simplified if desired to rely, for the clawing movement, on direct relative manipulations of the main rams on the head, is illustrated in the diagrammatic Figure 16 wherein the arrow indicates the operative direction of the scraper on the material of the antheap denoted by reference z.

Another ancillary device is one which can be used on occasion further to multiply the uprooting power of the apparatus. This device takes the form, as in Figure 14, of a heavily constructed toggle which can be erected in front of any particularly big or heavily rooted tree, such as the Baobab, and may conveniently comprise feet 35 which may straddle a lateral root, pillars 36 on the feet connected at their upper ends pivotally with an arm or arms 37 at the extremity of which an anchorage 38 may be provided for a wire rope or such like element securable to the aforesaid root when the arm or arms are inclined forwardly to bear on the trunk. At the pivotal, central region 39 of the toggle thus provided a stout abutment 40 is included for the application of already powerful pushing force to the toggle from a ram-actuable head of the kind already described as 14, Figures 1, 2 and 3. With the application of such force not only is felling thrust applied through the upper extremity of the toggle directly to the trunk but as the toggle ends are separated a powerful upward pull is applied on the root through the rope or the like to augment the felling action.

For making a secure connection of the head to the toggle, as also for the connection of other described alternative tools or fittings to it, the head, or any of a number of substitutable heads, may have a variety of holes or other formations for bolting or similarly fixing the parts in readily interchangeable fashion.

A further piece of equipment within this invention may take the form of a beam or the like as 41 in Figure 15, having clamps, belts or equivalent means as at 42 on it for grasping poles, and webs or the like 43 by which the beam may be attached to a head as aforementioned for lifting the pole into vertical position and generally maneuvering it for its erection in the ground, all necessary movements of the head being obtainable from the ram system.

Having now particularly described and ascertained the nature of my said invention and in what manner the same is to be performed I declare that what I claim is:

1. An improved apparatus of the character described comprising a frame member, a ground gripping member coupled to said frame, a head member spaced outwardly of said frame member and connected to said frame member by independently actuated fluid operated rams, said head member having triangularly spaced pivot points, each of which is connected to the frame by one of said rams, a fourth independently actuated fluid operated ram pivotally connected at one end thereof to the frame, and means connecting the other end thereof to two of the triangularly spaced pivot points.

2. An improved apparatus as in claim 1, wherein the means connecting the said other end of the fourth ram comprise a pair of linkages, one of which is disposed between said other end and the frame and the other of said linkages is disposed between said other end and the said two pivot points on the head.

3. An improved apparatus as in claim 1, wherein a beam connects the two lower pivot points and is provided with forwardly disposed teeth.

4. An improved apparatus of the character described, comprising a tractor mounted frame member, a head member spaced outwardly of said frame member, first, second and third independently actuated fluid operated ram members having their inner ends pivoted to said frame member and diverging outwardly relative to each other and pivoted to triangularly disposed points on said head member and a fourth independently fluid operated ram having its inner end pivoted to said frame member at a point spaced from the inner ends of said first, second and third rams and its outer end connected to said head.

5. An improved apparatus in accordance with claim 4, including ground gripping means coupled to said frame member.

6. An improved apparatus of the character described, comprising a tractor mounted support member, a head member spaced outwardly of said support member and first, second and third independently actuated fluid operated ram members having their inner ends pivoted to said support member and diverging outwardly relative to each other and pivoted to triangularly disposed points on said head member, said support member being rotatable about a vertical axis and said rams being rotatable about horizontal axis at their inner ends.

References Cited in the file of this patent

UNITED STATES PATENTS

| | | |
|---|---|---|
| Re. 23,989 | Wills et al. | Apr. 26, 1955 |
| 1,650,255 | Bannister | Nov. 22, 1927 |
| 2,304,282 | Ross | Dec. 8, 1942 |
| 2,494,225 | Blake | Jan. 10, 1950 |
| 2,538,102 | Keeler | Jan. 16, 1951 |
| 2,584,485 | McNeel | Feb. 5, 1952 |
| 2,639,048 | Glashaw | May 19, 1953 |
| 2,663,952 | Winget | Dec. 29, 1953 |
| 2,730,823 | Cassidy | Jan. 17, 1956 |
| 2,766,536 | Perkins | Oct. 16, 1956 |
| 2,768,759 | Holopainen | Oct. 30, 1956 |
| 2,781,927 | Holopainen | Feb. 19, 1957 |
| 2,840,254 | Bevan | June 24, 1958 |
| 2,858,626 | Toulmin | Nov. 4, 1958 |

FOREIGN PATENTS

| | | |
|---|---|---|
| 753,409 | Great Britain | July 25, 1956 |